(No Model.)

W. H. HITESHEW.
KITCHEN CABINET.

No. 431,974. Patented July 8, 1890.

Witnesses:

Inventor:
Wm. H. Hiteshew
By, James J. Shuly
Attorney.

UNITED STATES PATENT OFFICE.

WILLIAM HENRY HITESHEW, OF JOHNSTOWN, ASSIGNOR OF ONE-HALF TO J. B. STAMBAUGH, OF ALTOONA, PENNSYLVANIA.

KITCHEN-CABINET.

SPECIFICATION forming part of Letters Patent No. 431,974, dated July 8, 1890.

Application filed April 23, 1889. Serial No. 308,339. (No model.)

*To all whom it may concern:*

Be it known that I, WILLIAM HENRY HITESHEW, a citizen of the United States, residing at Johnstown, in the county of Cambria and State of Pennsylvania, have invented certain new and useful Improvements in Kitchen-Cabinets; and I do declare the following to be a full, clear, and exact description of the invention, such as will enable others skilled in the art to which it appertains to make and use the same.

This invention has relation to an improvement in kitchen-cabinets; and it has for its object to provide a cheap and efficient means for raising dough or the like.

The invention will be fully understood from the following description and claim when taken in connection with the accompanying drawings, in which—

Figure 1:
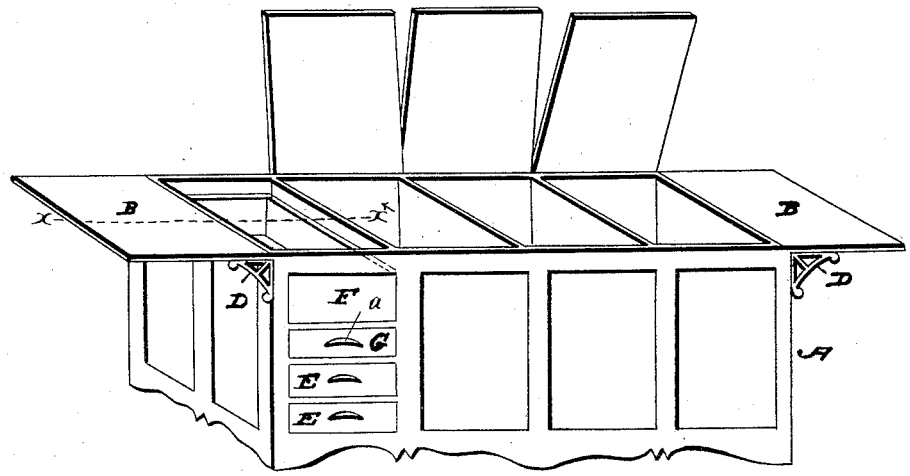
Figure 2:
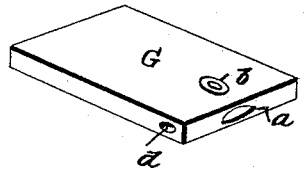
Figure 3:
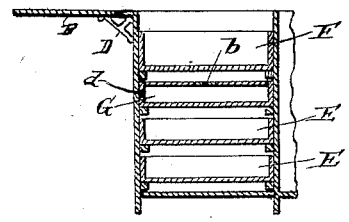

Figure 1 is a perspective view of a cabinet in connection with which my improvements are designed to be employed. Fig. 2 is a perspective view of the water chamber or holder removed from the cabinet, and in Fig. 3 is a vertical sectional view of a portion of the cabinet taken at the lines $x\ x$ on Fig. 1.

Referring by letter to the said drawings, A indicates a cabinet, which may be used for holding flour, meal, or the like, and may be of any ordinary or approved construction. This cabinet may have its greater portion divided into a series of bins or receptacles, as shown, and each receptacle is provided with a hinged door. The said cabinet may also be provided with covers B at opposite ends of the case, which when turned outwardly will rest upon brackets D and form kneading-boards. One portion of the cabinet is preferably provided with drawers, as indicated at E, and above these drawers I provide a removable trough or tray F, for the purpose of receiving dough to be raised.

G indicates my improved water box or trough, which is preferably of an elongated rectangular form, although it may be of any other shape desired. This water-box I have provided with a hand-piece $a$, whereby it may be moved upon suitable ledges arranged in the case or cabinet and beneath the dough tray or trough. I have also provided the box or receptacle with a filling-aperture $b$ and a lateral aperture $d$, whereby the water may be drawn off.

In operation when it is desired to raise dough placed in the trough or tray F, I fill the box G, which is preferably composed of tin or sheet metal, with hot water or other steam-giving liquid. I then slide this water-box into its place in the cabinet beneath the dough-trough, when the steam rising will effectually serve to properly raise the dough. I have found that by the use of this water-box employed with a cabinet the temperature in the dough-trough is kept more uniform, and that there is but little liability of failure in the raising of the dough, and that no care is required on the part of the attendant.

I am aware that it is not new to employ a metallic box to receive hot water to be used as a foot-warmer, and therefore do not claim such devices, broadly.

I am not aware that any one has heretofore adapted a water-box to take the place of an ordinary drawer in a kitchen-cabinet, whereby no special provision may be made for the heat-giving agent, the box I have shown being of a form to be slid upon the ledges which ordinarily support a drawer.

Having described my invention, what I claim is—

In a kitchen cabinet substantially as described, a removable dough-receptacle arranged in the upper portion of the cabinet, and the hot-water box G, having a filling-aperture $b$, a discharge-aperture $d$, and a handle $a$, said box being placed in the cabinet and upon the ledges beneath the dough-receptacle, whereby it may be removed and replaced as a drawer, substantially as specified.

WILLIAM HENRY HITESHEW.

Witnesses:
S. W. MILLER,
DAVID OTT.